US010807915B1

(12) United States Patent
Agarwal et al.

(10) Patent No.: US 10,807,915 B1
(45) Date of Patent: Oct. 20, 2020

(54) METHOD TO PRODUCE GRAPHENE FOAM REINFORCED LOW TEMPERATURE CO-FIRED CERAMIC (LTCC) COMPOSITES

(71) Applicants: Arvind Agarwal, Miami, FL (US); Benjamin Boesl, Miami, FL (US); Cheng Zhang, Miami, FL (US); Tony Thomas, Miami, FL (US); Pranjal Nautiyal, Miami, FL (US)

(72) Inventors: Arvind Agarwal, Miami, FL (US); Benjamin Boesl, Miami, FL (US); Cheng Zhang, Miami, FL (US); Tony Thomas, Miami, FL (US); Pranjal Nautiyal, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/835,583

(22) Filed: Mar. 31, 2020

Related U.S. Application Data

(60) Provisional application No. 62/867,367, filed on Jun. 27, 2019.

(51) Int. Cl.
  *C04B 35/52* (2006.01)
  *C04B 38/00* (2006.01)
  (Continued)

(52) U.S. Cl.
  CPC .......... *C04B 38/0022* (2013.01); *C04B 35/52* (2013.01); *C04B 41/009* (2013.01); *C04B 41/4539* (2013.01); *C04B 41/5024* (2013.01); *C04B 41/5031* (2013.01); *C04B 41/87* (2013.01); *C04B 2235/3217* (2013.01); *C04B 2235/3481* (2013.01); *C04B 2235/422* (2013.01); *C04B 2235/616* (2013.01)

(58) Field of Classification Search
  CPC ... C04B 38/0022; C04B 35/52; C04B 41/009; C04B 41/4539; C04B 41/5024; C04B 41/87; C04B 41/5031
  See application file for complete search history.

(56) References Cited

U.S. PATENT DOCUMENTS

| 4,764,195 | A | * | 8/1988 | Allaire | C03B 11/00 65/17.6 |
| 10,183,754 | B1 | * | 1/2019 | Agarwal | B64D 15/20 |

(Continued)

OTHER PUBLICATIONS

Si et al "A hierarchically structured composite of Mn3O4/3D graphene foam for flexible nonenzymnatic biosensors" J. Mater. B, 2013, 1, 110 (Year: 2013).*

(Continued)

*Primary Examiner* — Nathan H Empie
(74) *Attorney, Agent, or Firm* — Saliwanchik, Lloyd & Eisenschenk

(57) ABSTRACT

A graphene foam ceramic composite (GrF-CC) comprises an open cell graphene foam (GrF) surrounded by and infiltrated with a sintered low temperature co-fired ceramic (LTCC) matrix. The GrF-CC can be prepared by infiltrating an open cell GrF with an LTCC slurry, removing the solvent from the slurry with solidification to a ceramic-GrF green body, and sintering the ceramic-GrF green body to form the GrF-CC. Sintering by spark plasma sintering (SPS) allows an LTCC GrF-CC that has a density of at least 90%.

13 Claims, 6 Drawing Sheets

(51) Int. Cl.
  *C04B 41/00* (2006.01)
  *C04B 41/45* (2006.01)
  *C04B 41/50* (2006.01)
  *C04B 41/87* (2006.01)

(56) References Cited

U.S. PATENT DOCUMENTS

2006/0269753 A1* 11/2006 Peng ................. H01L 23/15
                                              428/408
2018/0244582 A1*  8/2018 Li ..................... C22C 1/08
2019/0112445 A1*  4/2019 Zhou ................. B22F 7/06

OTHER PUBLICATIONS

Qian et al "A free-standing Li4Ti5O12/ graphene foam composite as anode material for Li-ion hybrid supercapacitor" Electrochimica Acta 258 (2017)1311-1319 (Year: 2017).*

* cited by examiner

METHOD TO PRODUCE GRAPHENE FOAM REINFORCED LOW TEMPERATURE CO-FIRED CERAMIC (LTCC) COMPOSITES

CROSS-REFERENCE TO RELATED APPLICATION

This application claims the benefit of U.S. Provisional Application Ser. No. 62/867,367, filed Jun. 27, 2019, which is hereby incorporated by reference herein in its entirety, including any figures, tables, and drawings

BACKGROUND

Much attention has been given to 2D graphene for development of new composite materials with unprecedented properties and advanced applications. Due to extraordinary mechanical, thermal and electrical properties, graphene addition has been found to improve strength, toughness, stiffness and thermal-electrical conductivity of ceramic materials. Despite graphene's excellent intrinsic properties, there are numerous practical challenges associated with engineering graphene-ceramic composites with desired microstructure and predictable properties. Graphene flakes tend to agglomerate and form clusters arising from inter-molecular 7C-7C interactions. These agglomerates act as stress concentrators within the microstructure that can initiate failure upon mechanical loading. The non-homogeneous distribution can impede electron and phonon conduction, limiting electrical and thermal properties of the composites. To achieve homogeneity, various physical and chemical dispersion techniques have been adapted to integrate graphene into the ceramic matrix including, alone or in combination, ball milling, sonication, centrifugation, surface modification, and functionalization. Unfortunately, these techniques are time-consuming, expensive, and/or involve the addition of chemicals/secondary particles that lead to undesirable impurities and can physically and chemically damage the graphene flakes. Additionally, due to the 2D morphology of the graphene flakes, the degree of alignment of the graphene flakes can lead to highly anisotropic and inconsistent properties. These processing and microstructure control challenges in the formation of graphene-ceramic composites constitute major bottlenecks in bulk scale manufacturing and real-world application for this promising class of nanocomposites.

To simplify the processing and improve the microstructure homogeneity, graphene with a free-standing 3D architecture as the filler material in the composite can be used. Macroporous graphene foam (GrF) is a promising filler material for developing composites. GrF has an ultra-low density (<5 mg/cm$^3$), high surface area (~850 m$^2$/g), and large pore sizes (exceeding 500 µm). GrF consists of an interconnected network of nodes and branches, providing seamless pathways for the transfer of stresses, electrons, and phonons. The hierarchical structure of GrF has been exploited by infiltration with polymer resin followed by curing to create a composite material with a defined and homogeneous distribution of the filler phase. By introduction of a pre-fabricated 3D foam, superior microstructure control and uniform properties result without the need for complex dispersion techniques. As a result, this material displays remarkable flexibility and resistance to failure, damping capability, and excellent electrical and thermal conductivities. GrF-reinforced composites are desirable in application for strain sensors, supercapacitors, electrochemical biosensors, biocompatible scaffolds, electromagnetic shields, fuel cells, thermal interfaces, acoustic backers, vibration dampeners, and structural materials with enhanced failure resistance. Graphene foam's desirable mechanical attributes have been exploited in metallic metamaterials with ultra-high stiffness, damage tolerance, and fatigue resistance.

GrF-ceramic composites (GrF-CCs) have been prepared for applications in Li-ion batteries, supercapacitors, biosensors, and high-performance electromagnetic interference shielding. These applications require high surface area; hence, these composites are porous with a deposition or decoration of ceramic on the GrF surface. No dense, non-porous 3D GrF-ceramic matrix composite for structural applications have been demonstrated, even though a 3D GrF's interconnected network of branches could allow unprecedented toughness and stiffness in a dense ceramic by facilitating extensive stress transfer, crack deflection, and crack absorption. Such toughness and stiffness has been reported for 2D graphene-based composites, presumably due to the rather localized and discrete nature of the reinforcement graphene phase. Hence, the 3D continuous GrF holds the potential for superior ceramic composites with the additional advantages of enhanced electrical and thermal properties. Typically, processing and densification of ceramics requires application of relatively high temperatures and pressures, which is a major challenge when the intent is to preserve the structural integrity of GrF during ceramic densification.

BRIEF SUMMARY

Embodiments of the subject invention provide graphene foam ceramic composites (GrF-CCs) that include an open cell graphene foam (GrF) surrounded by and infiltrated with a sintered low temperature co-fired ceramic (LTCC) matrix. The GrF constitutes an intra-connected scaffold within the LTCC matrix. The GrF-CC can have a density of, for example, at least 90% or at least 95%. The GrF can be, for example, 0.1 wt % (weight percentage) to 1 wt % of the entire GrF-CC. The LTCC matrix can comprise at least one of $Al_2O_3$ and $Ca(Si,Al)_4O_8$. The LTCC matrix can be at least 25% alumina ceramic (e.g., at least 25% by weight alumina ceramic and/or 25% by volume alumina ceramic).

Embodiments of the subject invention also provide methods of preparing an GrF-CC where an LTCC slurry comprising an LTCC powder, a dispersant, and a solvent is infiltrated into GrF to form a slurry-infiltrated GrF. Upon removal of the solvent, the slurry can solidify to a ceramic-GrF green body, which can subsequently be sintered to form the GrF-CC. The LTCC slurry is effectively infiltrated when the ratio of the cell cross-section of the open cell GrF to the viscosity of the LTCC slurry is greater than 1 micrometer/centipoise (µm/cP). The GrF can have a cell cross-section in a range of from 100 µm to 700 µm. The LTCC powder can comprise particles having a hydrodynamic diameter in a range of from 100 nm to 20 µm, which can be included into the slurry at a loading of 20 wt % to 50 wt %. The dispersant can be included at, for example, 0.1 wt % to 2 wt %. The LTCC matrix can comprise at least 25% alumina. The LTCC powder can be α-$Al_2O_3$ and/or $Ca(Si,Al)_4O_8$. The solvent can be removed by vaporization that is carried out by heating the solvent above its boiling point (e.g., heating to 75° C. at atmospheric pressure). The solvent can be a single compound or a mixture of volatile compounds. Sintering can be carried out by spark plasma sintering (SPS) to achieve very high densities (e.g., at least 90% or even at least 95%). The SPS can be carried out at a temperature of, for example, 700° C. to 1500° C. and an applied pressure of, for example, 80 MPa to 200 MPa.

In an embodiment, the GrF-CC can be formed as a ceramic packaging material. In an embodiment, the GrF-CC can be part of a medical implant.

DETAILED DESCRIPTION

Figure 1:
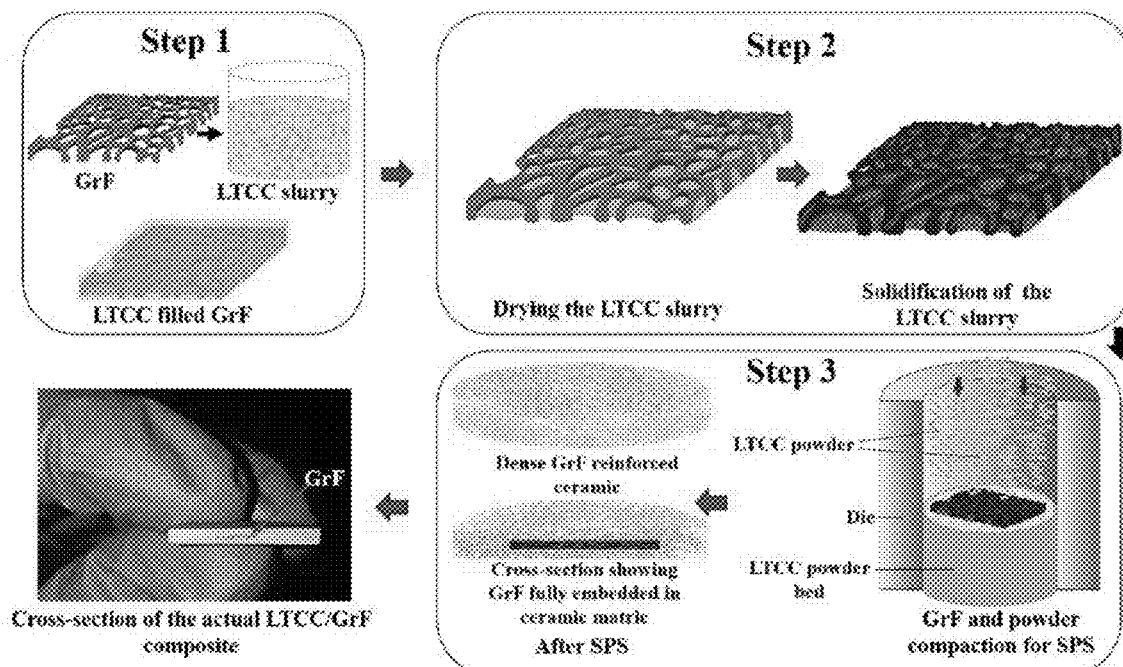
FIG. 1 shows a schematic representation of a three steps fabrication method, according to an embodiment of the invention, to produce full embedded closed cell GrF reinforced ceramic, according to an embodiment of the invention.

Embodiments of the subject invention provide graphene foam ceramic composites (GrF-CCs) that include an open cell graphene foam (GrF) surrounded by and infiltrated with a sintered low temperature co-fired ceramic (LTCC) matrix. The GrF constitutes an intra-connected scaffold within the LTCC matrix. The GrF-CC can have a density of, for example, at least 90% or at least 95%. The GrF can be, for example, 0.1 wt % to 1 wt % of the entire GrF-CC. The LTCC matrix can comprise at least one of $Al_2O_3$ and $Ca(Si,Al)_4O_8$. The LTCC matrix can be at least 25% alumina ceramic.

Embodiments of the subject invention also provide methods of preparing an GrF-CC where an LTCC slurry comprising an LTCC powder, a dispersant, and a solvent is infiltrated into GrF to form a slurry-infiltrated GrF. Upon removal of the solvent, the slurry can solidify to a ceramic-GrF green body, which can subsequently be sintered to form the GrF-CC. The LTCC slurry is effectively infiltrated when the ratio of the cell cross-section of the open cell GrF to the viscosity of the LTCC slurry is greater than 1 micrometer/centipoise ($\mu m/cP$). The GrF can have a cell cross-section in a range of from 100 $\mu m$ to 700 $\mu m$. The LTCC powder can comprise particles having a hydrodynamic diameter in a range of from 100 nm to 20 $\mu m$, which can be included into the slurry at a loading of 20 wt % to 50 wt %. The dispersant can be included at, for example, 0.1 wt % to 2 wt %. The LTCC matrix can comprise at least 25% alumina. The LTCC powder can be $\alpha$-$Al_2O_3$ and/or $Ca(Si,Al)_4O_8$. The solvent can be removed by vaporization that is carried out by heating the solvent above its boiling point (e.g., heating to 75° C. at atmospheric pressure). The solvent can be a single compound or a mixture of volatile compounds. Sintering can be carried out by spark plasma sintering (SPS) to achieve very high densities (e.g., at least 90% or even at least 95%). The SPS can be carried out at a temperature of, for example, 700° C. to 1500° C. and an applied pressure of, for example, 80 MPa to 200 MPa.

The sintering can also be done with no applied pressure at an elevated temperature (e.g., in a range of from 700° C. to 1500° C., such as at 850° C.) for a period of time (e.g., 20 minutes) in an inert atmosphere (e.g., argon) to ensure complete solidification of the LTCC slurry in the porous 3D graphene structure.

Embodiments of the subject invention provide dense 3D graphene foam ceramic composites (GrF-CCs) and a three-step method to fabricate such dense 3D GrF-CCs. The method involves: infiltration of ceramic slurry into a GrF; drying and solidification of the slurry; and pressure-assisted sintering of the ceramic-filled GrF. One or more GrFs resides within at least a portion of a continuous ceramic matrix. Upon completion of the infiltration and solidification of the ceramic, a ceramic-GrF green body forms the structural backbone of the porous GrF due to a solidified ceramic phase. This ceramic-GrF green body is subsequently sintered without compromising the 3D interconnected architecture of GrF. The ceramic is, for example, an alumina and silica, $\alpha$-$Al_2O_3$—$Ca(Si, Al)_4O_8$, low temperature co-fired ceramic (LTCC) that is rapidly densified by spark plasma sintering (SPS) to achieve an intimate ceramic/graphene interface within the composite. Low temperature co-fired ceramics that can be used are compositions where the ratio of $Al_2O_3$ ceramic to a glass is, for example, but not limited to, about 1:3. Common glass powder materials within the LTCC include calicia-magnesia-alumina, silicate glass, and Borosilicate glass. The glass powder adjusts the thermal expansion coefficient of the ceramic and reduces the sintering temperature of the pure $Al_2O_3$, which is about 1400° C. The type and proportion of glass adjust the material's dielectric constant. Ceramic and glass powders for the LTCC are generally ball grinded after mixing to achieve a uniform distribution of the desired sized particle, although any form of high shear mixing can be employed.

LTCC have widespread applications in packaging of electronic systems in automotive, military, space, medical and industrial installations. LTCCs are commonly integrated into Microelectromechanical systems (MEMS). Superior mechanical properties and thermal transport are desirable in LTCCs to have structural stability, thermal management, and product reliability. 3D GrF allows simultaneous enhancement of mechanical and thermal properties of LTCC at a low loading in wt %. GrF content of less than 1 wt % can enhance the mechanical, thermal, and electrical properties of the GrF-CC. GrF content of the GrF-CC can be, for example, 1, 0.9, 0.8, 0.7, 0.4, 0.5, 0.6, 0.3, 0.2, 0.1, or any value between 0.1 and 1 inclusive (all numerical values are wt %). The SPS technique allows fabrication of GrF-CC that preserves the GrF's reticulated cell structure. The highly reticulated 3D GrF structure is retained under high pressure and temperature conditions required to consolidate a dense ceramic by the method according to an embodiment of the invention. This contrasts with the normal handling of free-standing GrF, which is particularly delicate, and high pressure can easily destroy its interconnected and continuous structure.

The methods, according to embodiments of the subject invention, allow multifunctional ceramic composite materials with microstructural homogeneity, and superior mechanical and transport properties. A three-step method of an embodiment is schematically represented in FIG. 1.

Figures 2A, 2B:
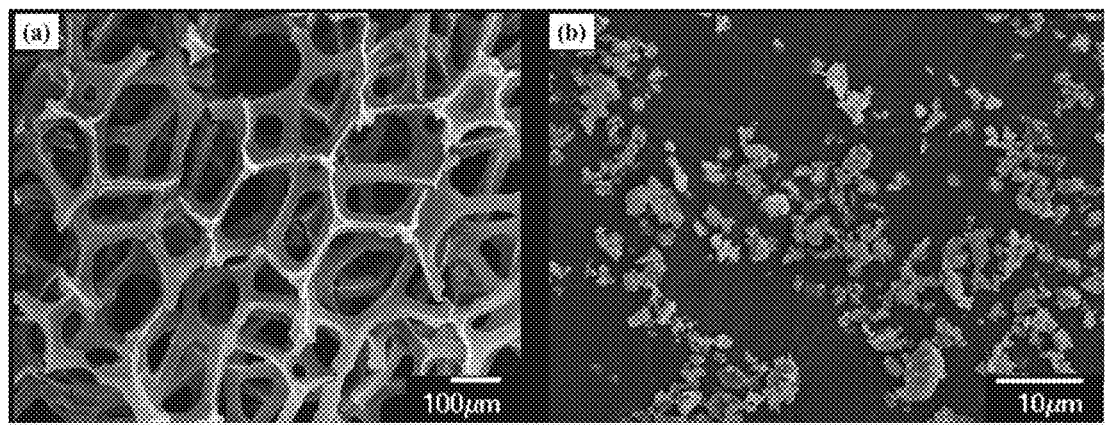
FIG. 2A shows a scanning electron microscope (SEM) image of an exemplary freestanding GrF used for fabricating a dense GrF-ceramic composite (GrF-CC), according to embodiments of the invention.
FIG. 2B shows a SEM image of an exemplary LTCC powder used for fabricating GrF-CC, according to embodiments of the invention.

The first step of the method is the infiltration of GrF by a low viscosity LTCC slurry, as shown in FIG. 1, to form a slurry infiltrated GrF. For example, the LTCC ceramic slurry can include 32 wt % of solids along with 0.57 wt % of fish oil dispersant in a terpineol solvent, as used during reduction to practice of a LTCC GrF-CC, in an embodiment. The solid loading of the LTCC ceramic slurry can be, for example, 20 wt % to 50 wt % and the dispersant can be, for example, 0.1 wt % to 2 wt %. Other dispersants and solvents can be employed and other components can be included in the LTCC comprising slurry. Other compositions of the slurry are possible as long as the ceramic particles are relatively smaller than the pore size of the GrF, as illustrated in FIG. 2A, where the pore size and shape of a free-standing GrF can be filled with the LTCC powder, as illustrated in FIG. 2B. In an embodiment, the average particle size of the LTCC is <3 and is readily packed within the approximately 540 μm pores of the GrF. The GrF can have open cell pores that are, for example, 100 μm to 700 μm in cross-section and the LTCC can have particles with a hydrodynamic diameter of, for example, 100 nm to 20 μm. By including additional components into the LTCC comprising slurry, where the additional components are of similar hydrodynamic diameter to that of the ceramic, the electrical conductivity, thermal conductivity, or mechanical strength can be independently augmented, particularly when the additional components are employed at sufficient quantity to achieve a percolation threshold of the additional component particles within the LTCC matrix. For example, by the inclusion of diamond particles into the slurry, the thermal conductivity of the GrF-CC can be improved without significant augmentation of the electrical conductivity of the GrF-CC. For example, by inclusion of graphene flakes into the slurry, the electrical conductivity of the GrF-CC can be further enhanced. The irregular shape of the LTCC powder particles assist in efficient powder packing during SPS. Slurry compositions are formulated based on an infiltration factor ($I_f$), which is the ratio of the cell size of the GrF to the viscosity of the infiltrate slurry. For efficient infiltration, the $I_f$ is greater than or about equal to 1 μm/cP. For example, terpineol, having a viscosity of 36.5 cP at RT, is used to form an LTCC slurry by 1 hour of ball milling the ceramic powder to yield a slurry viscosity of 80 cP at RT. For a GrF cell size of 540 μm, the $I_f$ value is 6.75 μm/cP. At this $I_f$ value, the slurry infiltrates the GrF efficiently to convert the open cell GrF to a completely closed cell GrF, as shown in Step 1 of the schematic in FIG. 1. For example, slurry viscosities can be 50 cP to 400 cP.

The second step of the method, according to an embodiment, is the evaporation of the solvent and solidification of the infiltrated LTCC slurry. This is achieved by a two-step heat treatment process. Initially, the slurry infiltrated GrF is heated to a first temperature for a first period of time, for example, but not limited to, 75° C. for 30 minutes, to evaporate solvent. Subsequent heating to a second temperature, for example, but not limited to, 850° C. for 20 minutes in an argon atmosphere completes the solidification. Typically, evaporation is at a temperature well above the boiling point of the solvent, which can be a mixture of solvents, and carried out for a sufficient time to remove the majority, for example, but not limited to about 95% of the solvent. The densified particulate LTCC encapsulates and fills the pores of the GrF, which act as a protective barrier to impart load-bearing functionality to the GrF-ceramic green body. The GrF's reticulated structure is retained under application of an external pressure by the confined LTCC in the GrF cells. This is advantageous for fabrication of electronic packaging for medical implants, according to an embodiment of the invention, where an electronic circuit is designed and is embedded on the GrF in Step 1 of the method, followed by solidification of the LTCC around the electronic circuitry to protect the circuit elements from external pressure to form a robust implant. Step 1 and 2 are crucial in the formation of the GrF-CC device.

Figure 3:
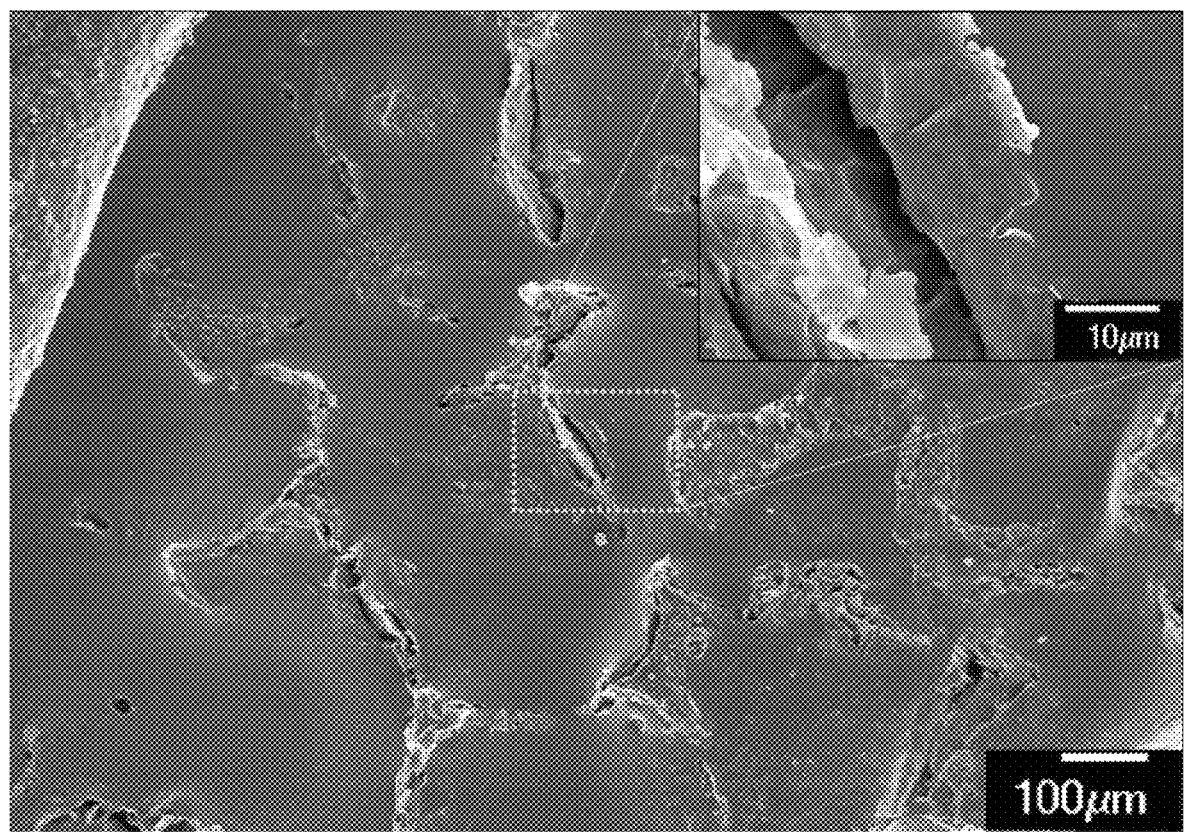
FIG. 3 shows an SEM image displaying surviving GrF features after step two of the fabrication method, according to an embodiment of the invention, where the insert magnified image shows a hollow GrF strut.

Preservation of reticulated GrF foam structure during fabrication of the GrF-CC is important for achievement of the desired properties, according to an embodiment of the invention. FIG. 3 shows an SEM image of a surface of the green body LTCC/GrF after step two of the fabrication method illustrated in FIG. 1. GrF features, like nodes and branches, remain intact, as shown in FIG. 3. In step 1, infiltration occurs without pressure and results from the gravity assisted infill of the LTCC slurry. The surface shown in FIG. 3 appears relatively dense with a good mechanical bonding between the graphene and LTCC. The de-bonded region, shown in the inset of FIG. 3, is the hollow strut of the GrF that resulted from etching of the Ni scaffold during a GrF fabrication process by CVD. The hollow struts are about 30-50 μm in diameter. Even though the average particle size of LTCC powder is <3 μm, infiltration fails to fill the hollow struts, and it appears that the Laplace pressure does not allow resin infiltration into the more narrow hollow struts due to capillary action, where the Laplace pressure act only on the liquid portion, and has little effect on the micron-sized solid ceramic particle portion. The inset shown in FIG. 3, infers intimate bonding of GrF's branches with the sintered LTCC matrix. The hollow interfacial profile can be eliminated during consolidation via SPS.

Step 3 of the method, according to an embodiment, is densification of LTCC/GrF green body by SPS. SPS is a technique that has been developed for rapid densification of ceramic materials, hard-metals, cermets, Al-based alloys, and other metallic powders. The LTCC/GrF green body is sandwiched between LTCC powder beds in a graphite die. The die is subjected to the sintering conditions to obtain a dense ceramic reinforced with GrF as a LTCC GrF-CC, according to an embodiment of the invention, with the GrF reticulated structure intact, as shown in FIG. 1. The GrF-CC can have a density of at least 90%, for example, 90, 91, 92, 93, 94, 95, 96, 97, 98 or 99%. From the optical images shown in FIGS. 4A and 4B, it is evident that the reticulated structure of the GrF remains intact after the GrF is subjected to high temperature and pressure during SPS. The silica in the LTCC composition allows effective densification of the ceramic at an SPS temperature as low as 700° C. The GrF in the ceramic amplifies the thermal and electrical conductivity in the dense GrF-CC. An exemplary sintered LTCC/GrF GrF-CC is 97.2% dense (i.e., has a density of 97.2%), whereas a comparative SPS sintered LTCC is 98.5% dense. The reduction in density is consistent with the presence of hollow struts of the GrF as shown in FIG. 3.

Figures 4A, 4B:
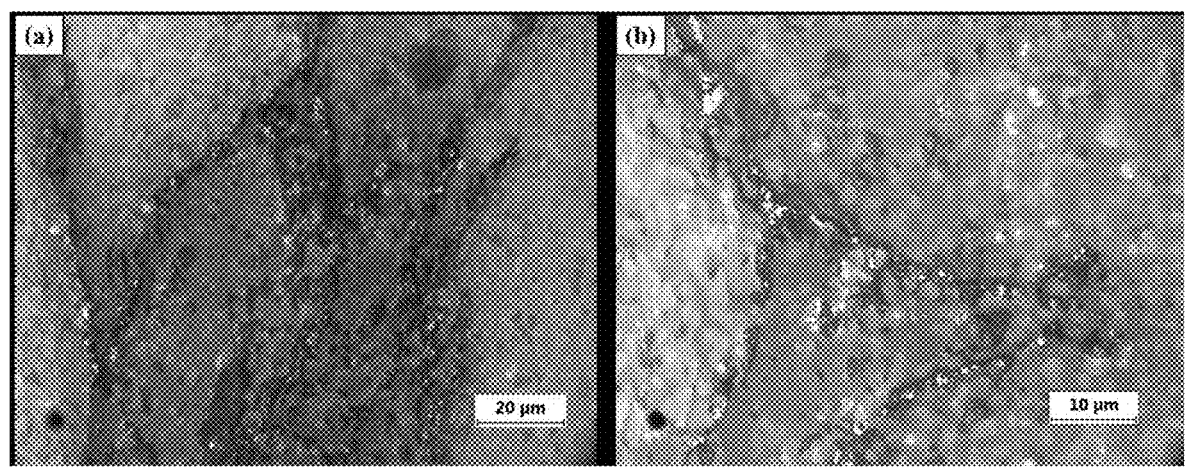
FIG. 4A shows an optical image of the LTCC/GrF GrF-CC cross-section after SPS displaying the hexagonal geometry of the GrF cell.
FIG. 4B shows an optical image of the LTCC/GrF GrF-CC cross-section after SPS displaying the unaltered branches and nodes of the GrF.

The infiltrated LTCC slurry provides sufficient support to allow the GrF to withstand the pressure of 100 MPa applied during SPS. The hexagonal profile of the embedded GrF, FIG. 4A, along with its branches and nodes, FIG. 4B, are visible in the SPS consolidated GrF-ceramic composite. Moreover, the hollow branches, as shown in the inset in FIG. 3, collapse into layers of graphene after sintering. Hence, the collapsed branches, in addition to cells filled with LTCC, are desirable for enhanced load bearing and stress transfer functionality in the material.

Figure 5:
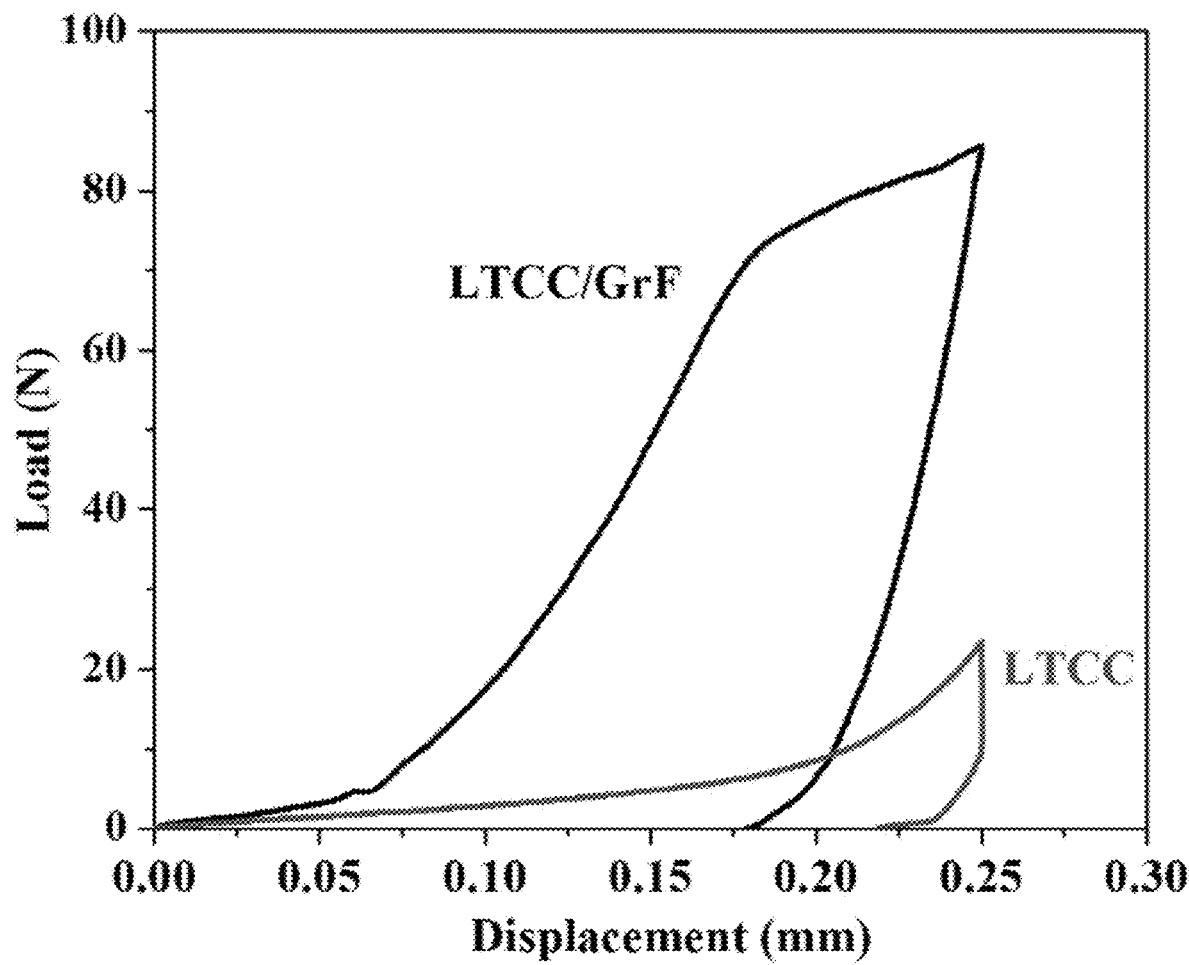
FIG. 5 shows force-displacement graphs of LTCC and LTCC/GrF GrF-CC, according to an embodiment of the invention, obtained using high load indentation.
Figure 6A:
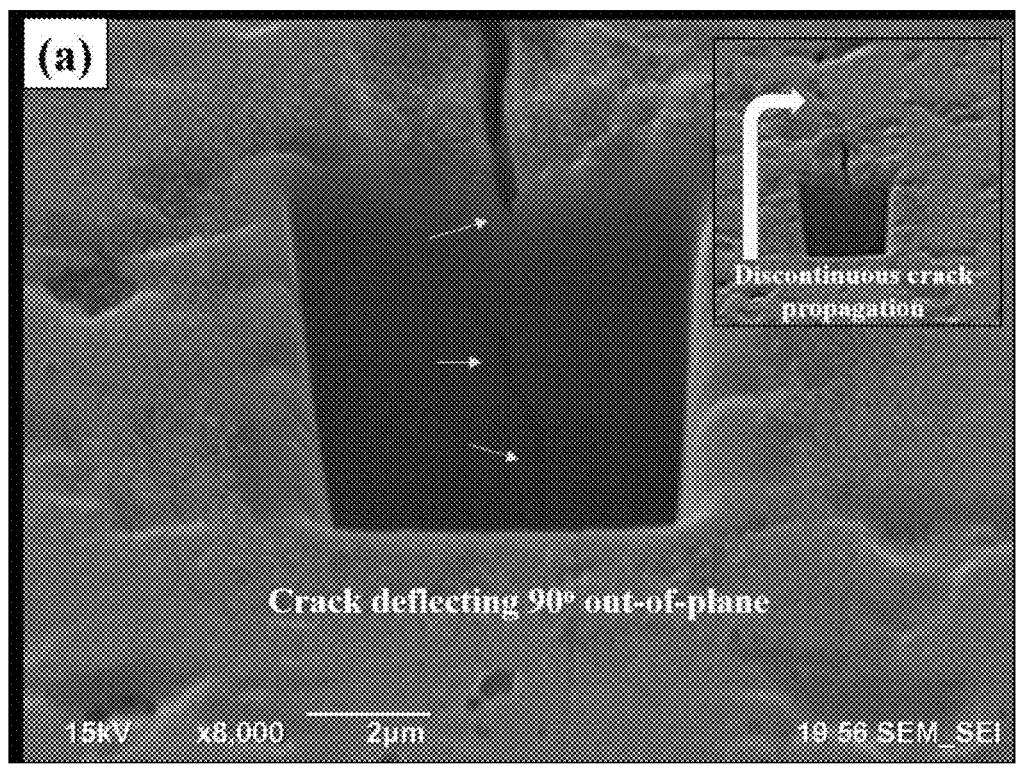
FIG. 6A shows a FIB-SEM image revealing crack deflection 90° out-of-plane for an exemplary LTCC/GrF GrF-CC, according to an embodiment of the invention.
Figure 6B:
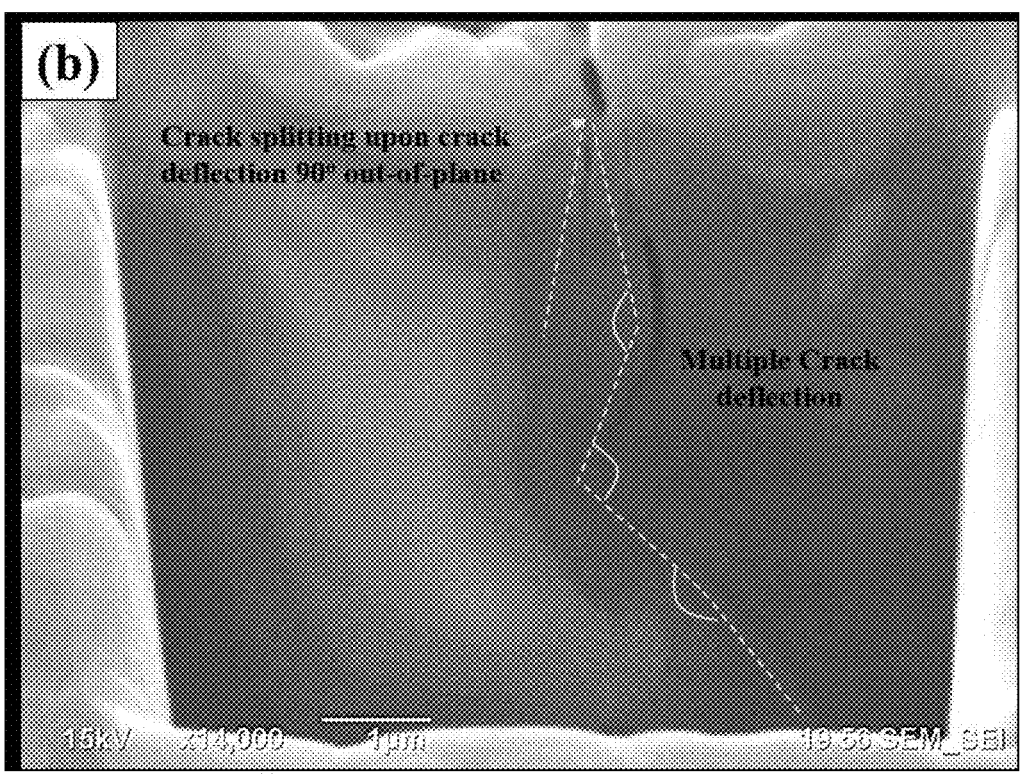
FIG. 6B shows a FIB-SEM image revealing multiple crack deflection in an exemplary LTCC/GrF GrF-CC, according to an embodiment of the invention.

The GrF reinforcement on the mechanical properties of the LTCC/GrF GrF-CC is evident from an evaluation using a high load, 100 N, instrumented indentation technique. Indentation test was performed on the polished cross-section of pure LTCC and GrF-LTCC composite samples. FIG. 5 shows load-displacement graphs portraying the behavior of the GrF-CC and LTCC samples under uniaxial compressive load in a displacement control mode. For a similar displacement of 0.25 mm, the exemplary LTCC/GrF GrF-CC can withstand about 4 times the load of the exemplary LTCC. The displacement recovery of the exemplary LTCC/GrF GrF-CC material is ~23% compared to the exemplary pure LTCC. GrF is known for its super-elastic metamaterial properties. This creates a site for efficient energy dissipation thus absorbing the deformation energy caused by loading. The area under the force-displacement curve in FIG. 5 represents the energy absorbed by the material upon deformation and fracture. The fracture energy for the exemplary LTCC/GrF GrF-CC is 7.54 mJ, as compared to 1.3 mJ for the exemplary LTCC, which is a ~480% improvement in the fracture energy of the LTCC by inclusion of a 0.18 wt % GrF reinforcement. Due to the intrinsic brittle nature of the LTCC, energy dissipated during high load indentation is released in the form of cracks nucleated from the indent. The measured crack length was 1031.2 µm for the exemplary LTCC sample as compared to a much shorter crack length of 215.5 µm for the exemplary LTCC/GrF GrF-CC. To establish the dominant fracture mechanism in LTCC/GrF GrF-CCs, the crack generated by indentation on an exemplary composite was investigated by focused ion beam-scanning electron microscopy (FIB-SEM) as shown in FIGS. 6A and 6B. The inset in FIG. 6A shows a crack emanating from a region below the indent. The crack does not propagate as a continuous line, instead the crack manifest as a discontinuous line. FIG. 6A is the FIB-SEM of the sub-surface showing the crack which deflected 90° out-of-plane. This suggests that the GrF alters the behavior of crack propagation and crack deflection can be the dominant fracture mechanism as multiple crack deflection is indicated in FIG. 6B.

To establish the influence of GrF on the electrical property of LTCC, a four-point probe DC electrical characterization at room temperature and pressure was conducted. Pure LTCC (Dupont 951) is an electrically insulating material with a dielectric constant of 7.8. Hence it is widely used in the fabrication of micro-resistors and micro-capacitors. Due to the high electrical resistance above the range of a DMM used, no specific resistance value was obtained for a pure LTCC sample. For the exemplary LTCC/GrF GrF-CC, electrical conductivity is dominated by the GrF's intrinsic properties and the material recorded a total electrical conductivity of 165 S/m. The high electrical conductivity in 3D GrF, of about $10^6$ S/m, stems from the adjacent graphene sheets being bonded by van der Waals force resulting in contact conductance. The electrical conductivity of GrF is highly influenced by the bending stress at the node and adhesion energy between individual Gr sheets at a characteristic length scale. The length and width of individual Gr sheets forming the holistic GrF also contribute to its electron and phonon transfer phenomenon. The LTCC infiltrate may exert compression on the GrF within the GrF-CC and increase the contact area between individual Gr sheets to increase the electrical property by contact conductance phenomenon. The induced electrical conductivity in the LTCC/GrF is consistent with a reticulated structure of the GrF that is intact after SPS. The conductivity can be modified by the GrF content in the GrF-CC.

Figure 7A:
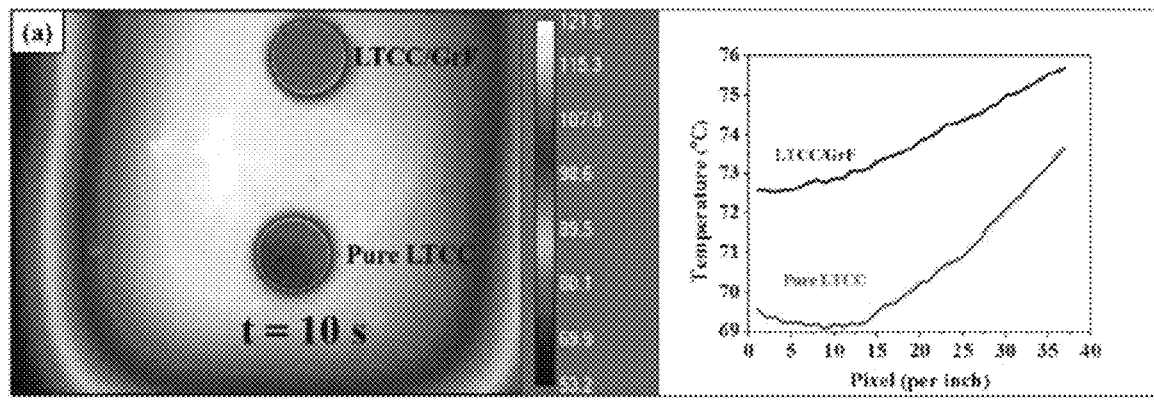
FIG. 7A shows a thermal image and a plot of temperature measurements at different resolutions in pixels per inch of cylindrical LTCC/GrF GrF-CC samples, according to an embodiment of the invention, and pure LTCC after heating for 10 seconds.
Figure 7B:
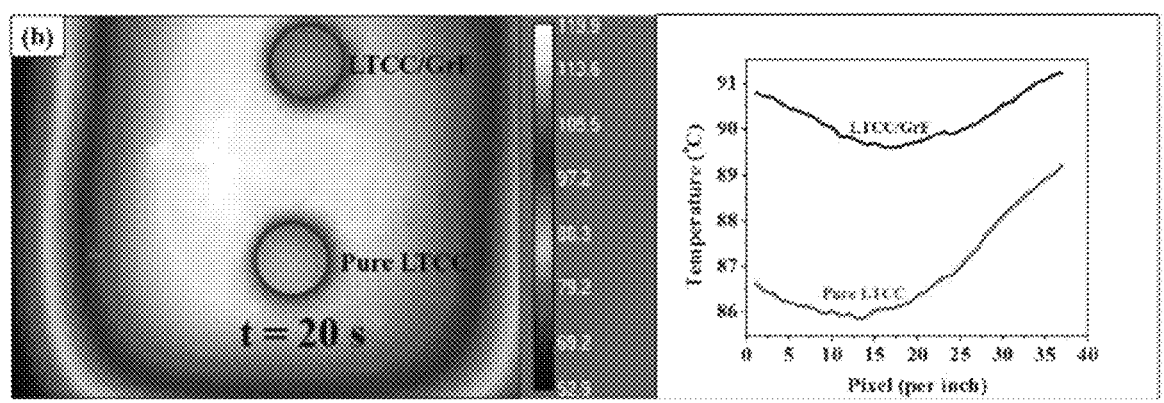
FIG. 7B shows a thermal image and a plot of temperature measurements at different resolutions in pixels per inch of cylindrical LTCC/GrF GrF-CC samples, according to an embodiment of the invention, and pure LTCC after heating for 20 seconds.
Figure 7C:
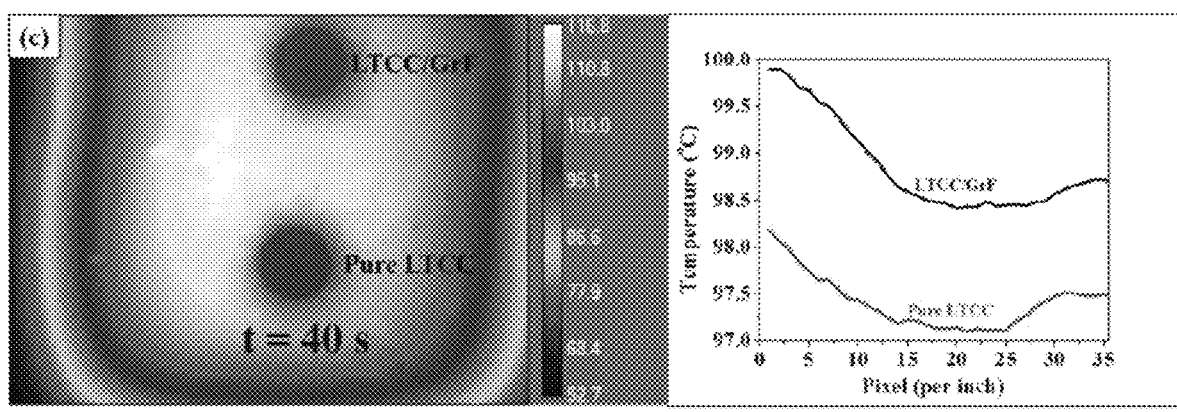
FIG. 7C shows a thermal image and a plot of temperature measurements at different resolutions in pixels per inch of cylindrical LTCC/GrF GrF-CC samples, according to an embodiment of the invention, and pure LTCC after heating for 40 seconds.
Figure 8:
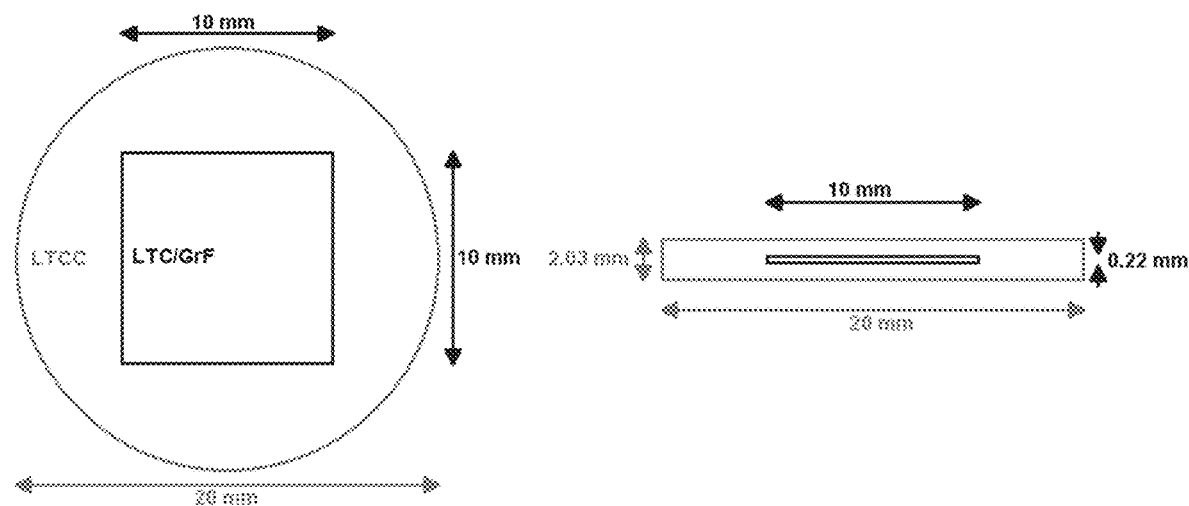
FIG. 8 shows the dimensions and position of a GrF-CC, according to an embodiment of the invention, where a square GrF-CC portion is situated centrally within a cylindrical LTCC pellet.

The thermal property of GrF-CCs can be shown by thermal analysis using an infrared camera. An exemplary LTCC/GrF GrF-CC and exemplary LTCC sample were placed on an isothermal hotplate maintained at 100° C. The change in sample temperature with time was monitored for both samples. FIGS. 7A-7C shows thermal images of the samples at different times at different sample temperature. As indicated in FIGS. 7A-7C, the LTCC/GrF GrF-CC conducts heat at a higher rate than pure LTCC sample, and the LTCC/GrF GrF-CC conducts heat more uniformly across the bulk as observed by a more uniform coloration of the test samples. At a very low GrF wt %, as in the exemplary 0.18 wt %, the GrF-CC exhibits not only improved mechanical properties but also displays enhanced electrical and thermal conductivity due to electron and phonon transfer, respectively. The improvement in thermal conductivity is in the range of 1° C./s, even when a small portion of the sample, as in the exemplary 20 $mm^3$ of GrF-CC is present within the much larger, about 638 $mm^3$, of the cylindrical sample, as indicated in FIG. 8.

By controlling the wt % of GrF in the GrF-CC, one can fine tune the thermal and electrical properties of the material along with mechanical enhancement. The highly reticulated 3D architecture of the GrF in the GrF-CC can be used as an improved ceramic packaging material. The closed cell, fully embedded GrF-CC can be used as components for medical implants or sensors. The processing technology enables in the fabrication of advanced engineering materials with multifunctional properties, displaying excellent mechanical, electrical and thermal properties, for use in aggressive environments, such as, but not limited to, satellite communication systems, automobile control systems, and aerospace control systems.

Methods and Materials

Free-standing GrF was received from Graphene Supermarket (Calverton, N.Y., USA). The LTCC powder was obtained from Dupont (Wilmington, Del., USA) commercially known as Dupont 951. Though the exact composition of the powder is proprietary, the major phase structure is composed of $\alpha$-$Al_2O_3$ and $Ca(Si,Al)_4O_8$. The viscosity of the ceramic slurry was measured by Brooksfield DV-II viscometer. SPS was performed at 700° C. for 15 minutes at 50° C./min at an applied pressure of 100 MPa.

Field-emission scanning electron microscope (FE-SEM JEOL JSM-6330F, JEOL Ltd. Tokyo, Japan) was employed to inspect the top and fracture surfaces of LTCC and LTCC/GrF GrF-CC samples. Optical Microscope (Versamet 3, Buehler, Lake Bluff, Ill., USA) was used to ensure the retention of the GrF's 3D architecture after each processing step. Mechanical properties were analyzed on sintered pellets. A 100 N instrumented indentation was performed by a linear, screw driven micro-load frame (SEM Tester 1000, MTI Instruments Inc. USA.) with an attached Vickers tip. Indentation tests were carried out on a polished surface with a maximum displacement of 0.25 mm. A Multi-Beam Focused Ion Beam (FIB, JEOL-JIB 4500, JEOL Ltd. Tokyo, Japan) was employed to mill the cracked surface for observing the sub-surface fracture mechanism in the LTCC/GrF composite material. The electrical conductivity of the LTCC/GrF GrF-CC was evaluated using a DC four-point-probe method with a Keithly 2401 digital multimeter at room temperature and pressure. A T450 sc thermal imaging camera from FLIR was employed for thermal studies.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of preparing a graphene foam ceramic composite (GrF-CC), the GrF-CC comprising an open cell graphene foam (GrF) surrounded by and infiltrated with a sintered low temperature co-fired ceramic (LTCC) matrix, the GrF comprising an intra-connected scaffold within at least a portion of the LTCC matrix, and the GrF-CC being at least 90% dense, the method comprising:
   providing the open cell GrF;
   providing an LTCC slurry comprising an LTCC powder, a dispersant, and a solvent;
   infiltrating the GrF with the LTCC slurry to form a slurry infiltrated GrF;
   removing the solvent from the slurry infiltrated GrF with solidification of a ceramic-GrF green body; and
   sintering the ceramic-GrF green body to form the GrF-CC.

2. The method according to claim 1, the ratio of a cell cross-section of the open cell GrF to a viscosity of the LTCC slurry being greater than 1 μm/cP.

3. The method according to claim 2, the cell cross-section of the open cell GrF being in a range of from 100 μm to 700 μm, and
   the LTCC powder comprising particles with a hydrodynamic diameter in a range of from 100 nm to 20 μm.

4. The method according to claim 1, the LTCC powder being 20 wt % to 50 wt % of the LTCC slurry.

5. The method according to claim 1, the dispersant being 0.1 wt % to 2 wt % of the LTCC slurry.

6. The method according to claim 1, the LTCC powder comprising at least 25% alumina.

7. The method according to claim 1, the LTCC powder comprising α-$Al_2O_3$ and $Ca(Si,Al)_4O_8$.

8. The method according to claim 1, the removing of the solvent comprising vaporizing the solvent.

9. The method according to claim 1, the sintering being performed with no applied pressure in an inert atmosphere and at a temperature in a range of from 700° C. to 1500° C.

10. The method according to claim 1, the solvent comprising one or more volatile compounds.

11. The method according to claim 1, the dispersant being fish oil and the solvent comprising at least one terpineol,
   the sintering being spark plasma sintering (SPS),
   the SPS being performed at a temperature in a range of from 700° C. to 1500° C., and
   the SPS being performed at an applied pressure in a range of from 80 MPa to 200 MPa.

12. The method according to claim 11,
   the ratio of a cell cross-section of the open cell GrF to a viscosity of the LTCC slurry being greater than 1 μm/cP,
   the cell cross-section of the open cell GrF being in a range of from 100 μm to 700 μm,
   the LTCC powder comprising particles with a hydrodynamic diameter in a range of from 100 nm to 20 μm,
   the LTCC powder being 20 wt % to 50 wt % of the LTCC slurry,
   the dispersant being 0.1 wt % to 2 wt % of the LTCC slurry,
   the LTCC powder comprising at least 25% alumina,
   the LTCC powder comprising α-$Al_2O_3$ and $Ca(Si,Al)_4O_8$,
   the removing of the solvent comprising vaporizing the solvent,
   the removing of the solvent being carried out at ambient pressure,
   the removing of the solvent being carried out at a temperature at or above the boiling point of the solvent, and
   the solvent comprising one or more volatile compounds.

13. A method of preparing a graphene foam ceramic composite (GrF-CC), the GrF-CC comprising an open cell graphene foam (GrF) surrounded by and infiltrated with a sintered low temperature co-fired ceramic (LTCC) matrix, the GrF comprising an intra-connected scaffold within at least a portion of the LTCC matrix, and the GrF-CC being at least 90% dense, the method comprising:
   providing the open cell GrF;
   providing an LTCC slurry comprising an LTCC powder, a dispersant, and a solvent;
   infiltrating the GrF with the LTCC slurry to form a slurry infiltrated GrF;
   removing the solvent from the slurry infiltrated GrF with solidification of a ceramic-GrF green body; and
   sintering the ceramic-GrF green body to form the GrF-CC,
   the ratio of a cell cross-section of the open cell GrF to a viscosity of the LTCC slurry being greater than 1 μm/cP,
   the cell cross-section of the open cell GrF being in a range of from 100 μm to 700 μm,
   the LTCC powder comprising particles with a hydrodynamic diameter in a range of from 100 nm to 20 μm,
   the LTCC powder being 20 wt % to 50 wt % of the LTCC slurry,
   the dispersant being 0.1 wt % to 2 wt % of the LTCC slurry,
   the LTCC powder comprising at least 25% alumina,
   the LTCC powder comprising α-$Al_2O_3$ and $Ca(Si,Al)_4O_8$,
   the removing of the solvent comprising vaporizing the solvent,
   the solvent comprising one or more volatile compounds,
   the dispersant being fish oil and the solvent comprising at least one terpineol, and the sintering being performed with no applied pressure in an inert atmosphere and at a temperature in a range of from 700° C. to 1500° C.

\* \* \* \* \*